(12) United States Patent
Chen et al.

(10) Patent No.: US 7,688,538 B1
(45) Date of Patent: Mar. 30, 2010

(54) DISK DRIVE COMPRISING A DISK SURFACE HAVING TRACK ADDRESSES OF VARYING WIDTH

(75) Inventors: Min Chen, San Leandro, CA (US); Duc T. Phan, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 174 days.

(21) Appl. No.: 11/941,467

(22) Filed: Nov. 16, 2007

(51) Int. Cl.
*G11B 21/02* (2006.01)

(52) U.S. Cl. ....................................................... 360/75
(58) Field of Classification Search .................. None
See application file for complete search history.

(56) References Cited

U.S. PATENT DOCUMENTS

| | | | |
|---|---|---|---|
| 5,526,202 A * | 6/1996 | Blagaila et al. ............... 360/48 |
| 5,923,492 A | 7/1999 | Liikanen |
| 5,946,157 A | 8/1999 | Codilian et al. |
| 6,023,389 A | 2/2000 | Cunningham |
| 6,052,250 A * | 4/2000 | Golowka et al. ......... 360/77.08 |
| 6,091,564 A | 7/2000 | Codilian et al. |
| 6,108,150 A * | 8/2000 | Lee ............................ 360/48 |
| 6,433,950 B1 | 8/2002 | Liikanen |
| 6,452,990 B1 * | 9/2002 | Leis et al. ..................... 360/27 |
| 6,469,849 B1 | 10/2002 | Ellis et al. |
| 6,519,107 B1 | 2/2003 | Ehrlich et al. |
| 6,760,184 B1 | 7/2004 | Cunningham |
| 6,765,737 B1 * | 7/2004 | Lim et al. ..................... 360/48 |
| 6,775,081 B2 * | 8/2004 | Ottesen et al. ................ 360/48 |
| 6,798,592 B1 * | 9/2004 | Codilian et al. ............... 360/48 |
| 6,917,487 B2 | 7/2005 | Fukushima |
| 6,977,792 B1 | 12/2005 | Melrose et al. |
| 6,995,941 B1 | 2/2006 | Miyamura et al. |
| 6,999,266 B1 | 2/2006 | Schmidt |
| 7,012,771 B1 * | 3/2006 | Asgari et al. .................. 360/48 |
| 7,023,644 B2 * | 4/2006 | Jeong .......................... 360/75 |
| 7,027,257 B1 | 4/2006 | Kupferman |
| 7,035,036 B2 | 4/2006 | Shimomura et al. |
| 7,068,461 B1 | 6/2006 | Chue et al. |
| 7,075,743 B2 | 7/2006 | Nishida et al. |
| 7,089,353 B2 | 8/2006 | Chainer et al. |
| 7,099,105 B2 | 8/2006 | Ehrlich |
| 7,110,208 B1 | 9/2006 | Miyamura et al. |
| 7,130,146 B2 | 10/2006 | Ehrlich |
| 7,133,243 B2 | 11/2006 | Hirano et al. |
| 7,149,043 B2 | 12/2006 | Ehrlich |
| 7,167,335 B1 | 1/2007 | Ehrlich |
| 7,177,110 B2 | 2/2007 | Ehrlich et al. |
| 7,180,696 B2 | 2/2007 | Ehrlich |
| 7,239,472 B2 * | 7/2007 | Sado et al. .................... 360/48 |
| 7,489,464 B1 * | 2/2009 | McNab et al. ................ 360/75 |
| 2006/0098327 A1 | 5/2006 | Ehrlich et al. |

* cited by examiner

*Primary Examiner*—Hoa T Nguyen
*Assistant Examiner*—James L Habermehl

(57) ABSTRACT

A disk drive is disclosed comprising a disk surface having a plurality of servo sectors for defining a plurality of servo tracks, and a head actuated radially over the disk surface. A first servo sector defines a first servo track comprising a first track address having a first width, and a second servo sector defines a second servo track comprising a second track address having a second width substantially less than the first width. In one embodiment the servo sectors are written using an external servo writer or media writer, and in another embodiment the servo sectors are self-servo written by the disk drive.

14 Claims, 7 Drawing Sheets

FIG. 1B
(Prior Art)

| TKID | | | |
|---|---|---|---|
| TKID -1₁ | +X | +Y | Z1 IF (X<0 AND Y<0); IF TKID ODD, ADD ONE | EVEN |
| TKID -1₂ | +X | -Y | Z2 IF (X>0 AND Y<0); IF TKID ODD, SUB ONE | EVEN |
| TKID 0₁ | -X | -Y | Z3 IF (X>0 AND Y>0); IF TKID EVEN, ADD ONE | ODD |
| TKID 1₁ | -X | +Y | Z4 IF (X<0 AND Y>0); IF TKID EVEN, SUB ONE | ODD |
| TKID 1₂ | +X | +Y | Z1 IF (X<0 AND Y<0); IF TKID ODD, ADD ONE | EVEN |
| TKID 2₁ | +X | -Y | Z2 IF (X>0 AND Y<0); IF TKID ODD, SUB ONE | EVEN |
| TKID 2₂ | -X | -Y | Z3 IF (X>0 AND Y>0); IF TKID EVEN, ADD ONE | ODD |
| TKID 3₁ | -X | +Y | Z4 IF (X<0 AND Y>0); IF TKID EVEN, SUB ONE | ODD |
| TKID 3₂ | | | | |

FIG. 4

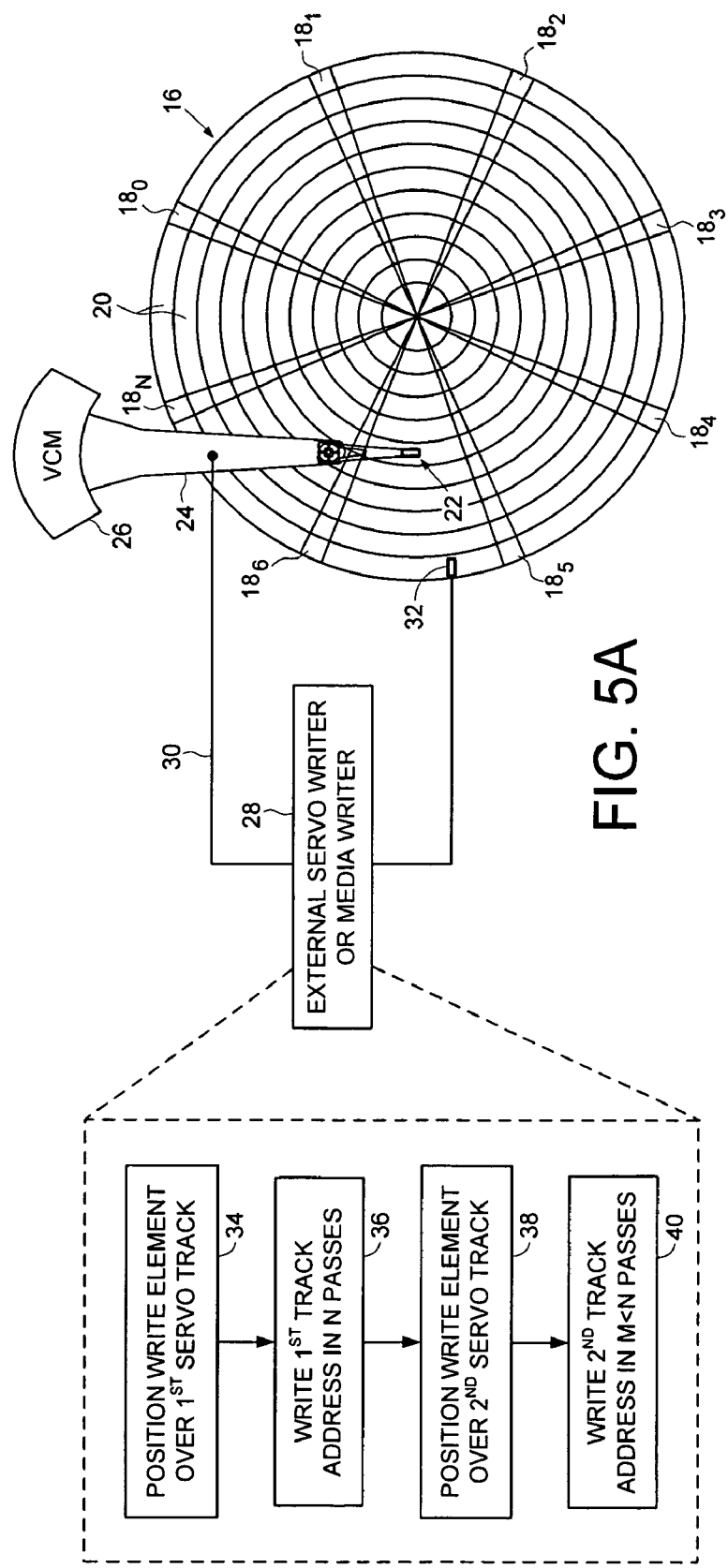

DISK DRIVE COMPRISING A DISK SURFACE HAVING TRACK ADDRESSES OF VARYING WIDTH

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The servo sectors $6_0$-$6_N$ may be written to the disk using any suitable technique, such as an external servo writer which writes the servo sectors on the disk after the disk is inserted into the head disk assembly (HDA), or using a media writer or stamping technique which writes (or stamps) the servo sectors on the disk prior to being inserted into the HDA. Alternatively, the disk drive may self-servo write the servo sectors using circuitry internal to the disk drive.

Regardless of the technique used to write the servo sectors, each track address is typically written over multiple passes. This is illustrated in the example servo pattern shown in FIG. 1B wherein each track address (TKID) is written over two passes (and trimmed during a third pass). For example, when writing the track address TKID 1, the write element is positioned so as to write the upper half of the track address TKID $1_1$ during a first revolution. The write element is then moved one half a track in order to write the lower half of the track address TKID $1_2$ during a second revolution. The write element is then moved another half track in order to trim the lower half the track address TKID $1_2$ while writing the first half of track address TKID $2_1$. As can be seen in FIG. 1B, this servo track writing process results in four seams (e.g., seams X1, X2, X3, and X4) for every two servo tracks written. At each seam an erase band manifests due to the fringe field emanating from the write element which degrades the quality of the written servo data.

There is, therefore, a need to ameliorate the undesirable effect of erase bands in the servo data of a disk drive.

BRIEF DESCRIPTION OF THE DRAWINGS

FIG. 1B shows a prior art servo sector format and corresponding demodulation algorithm for demodulating a track address within the servo sectors.

FIG. 4 shows a servo sector format according to an embodiment of the present invention wherein the servo bursts are written as null-phase servo bursts.

FIG. 5A shows an embodiment of the present invention wherein an external servo writer or media writer is used to write the servo sectors to the disk.

FIG. 5B is a flow diagram according to an embodiment of the present invention executed by the external servo writer or media writer to write the servo sectors to the disk.

DETAILED DESCRIPTION OF EMBODIMENTS OF THE INVENTION

Figure 2:
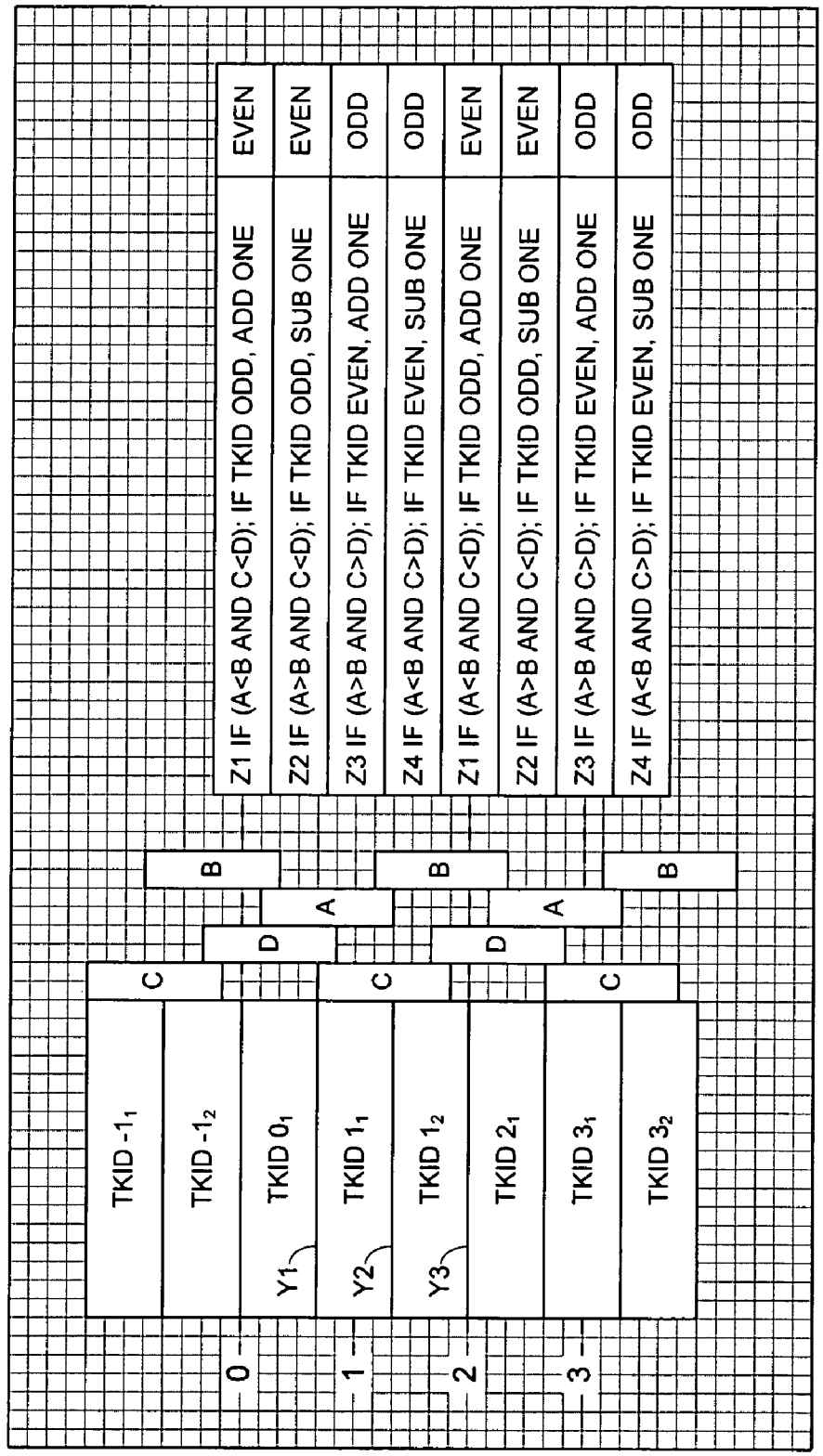
FIG. 2 shows a servo sector format according to an embodiment of the present invention and corresponding demodulation algorithm wherein a number of erase bands is reduced compared to the prior art servo sector format of FIG. 1B.

FIG. 2 shows a servo sector format for use in a disk drive according to an embodiment of the present invention. The disk drive includes a disk surface comprising a plurality of servo sectors for defining a plurality of servo tracks, and a head actuated radially over the disk surface. A first servo sector for defining a first servo track comprises a first track address (e.g., TKID 1) having a first width, and a second servo sector for defining a second servo track comprises a second track address (e.g., TKID 2) having a second width substantially less than the first width. For example, the second width may be at least 25% less than the first width.

In the embodiment shown in FIG. 2, the odd numbered track address are written in two passes, and the even numbered track addresses are written in one pass. In this manner, there are three erase bands for every two track addresses (e.g., erase bands Y1, Y2, Y3) as compared to four erase bands X1, X2, X3, X4 for every two track addresses in the prior art format shown in FIG. 1B. Thus, in the embodiment shown in FIG. 2, the even numbered track addresses are approximately half the width of the odd numbered track addresses. Also in the embodiment of FIG. 2, the width of each servo burst is less than the width of the odd numbered track addresses.

In one embodiment, the process of servo writing the track addresses shown in FIG. 2 is as follows:

1. write track address TKID $-1_1$ and the C servo burst during a first pass;

2. move the head radially three units and write the B servo burst during a second pass (where a unit equals one quarter of an even track address in the example shown in FIG. 2);
3. move the head radially one unit and write track address TKID $-1_2$ while trimming TKID $-1_1$ during a third pass;
4. move the head radially two units and write the D servo burst during a fourth pass;
5. move the head radially two units and write the track address TKID $0_1$ while trimming TKID $-1_2$ during a fifth pass;
6. move the head radially one unit and write the A servo burst during a sixth pass; and
7. continue the process starting with step 1 for the next servo sector.

In this embodiment, the odd numbered track addresses are written over two passes (two disk revolutions) while the even numbered track addresses are written over one pass (one disk revolution). However, the track addresses may be written over any suitable number of passes, and in one embodiment a first track address is written over N revolutions of the disk and a second track address is written over M revolutions of the disk, where M is less than N.

In one embodiment, additional data may be written in the servo sector when writing the track addresses. For example, in one embodiment each servo sector may begin with a preamble (e.g., a 2T preamble) for synchronizing timing recovery and gain control, followed by a sync mark for synchronizing to the servo data field (which includes the track address). In one embodiment, the additional data (e.g., preamble and sync mark) may be written along with the track address. In another embodiment, the additional data (e.g., repeatable runout (RRO) values) may be written to each servo sector after writing the track address.

Figure 1A:
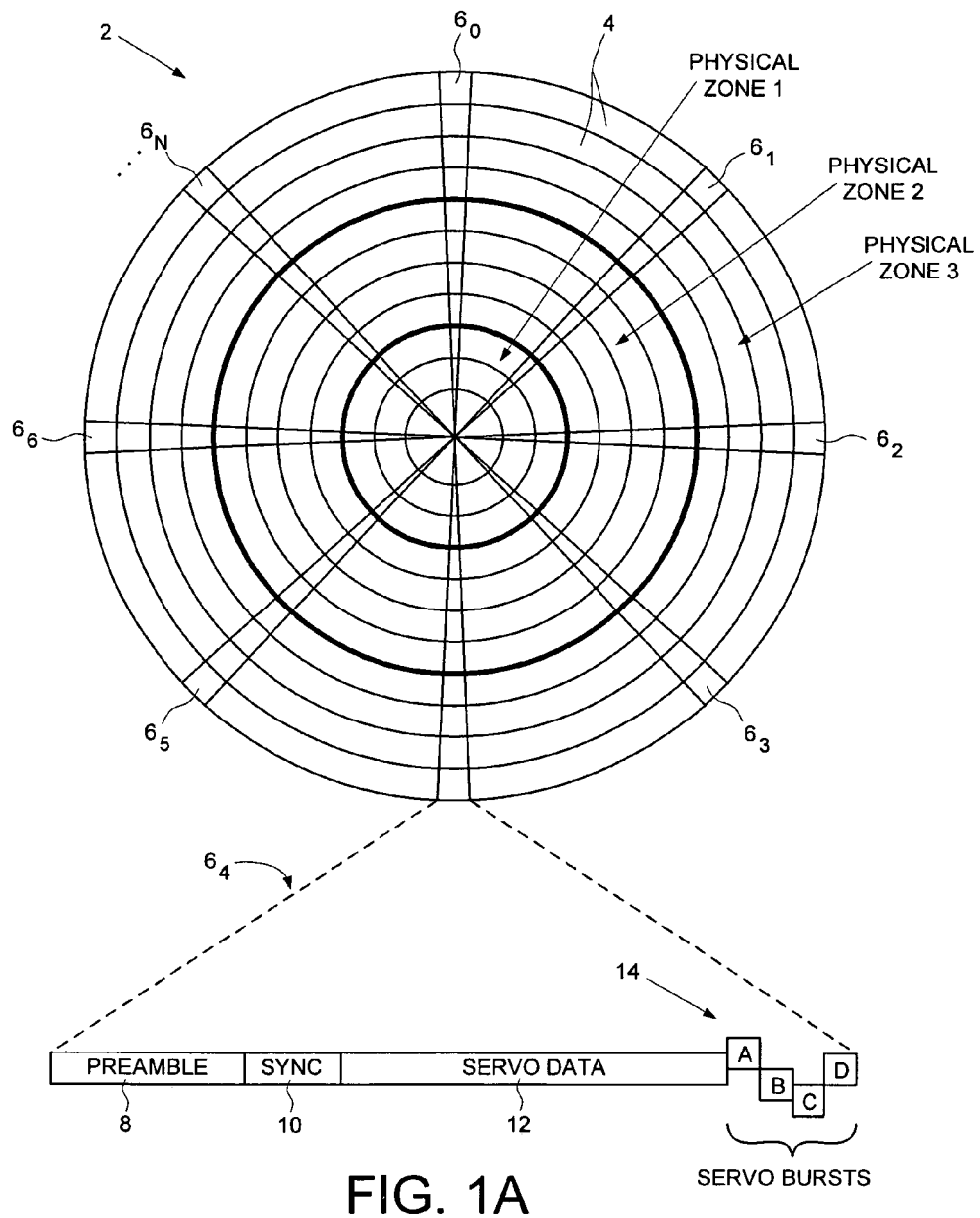
FIG. 1A shows a prior art disk format comprising a plurality of servo sectors that define a plurality of data tracks.
Figure 1B:
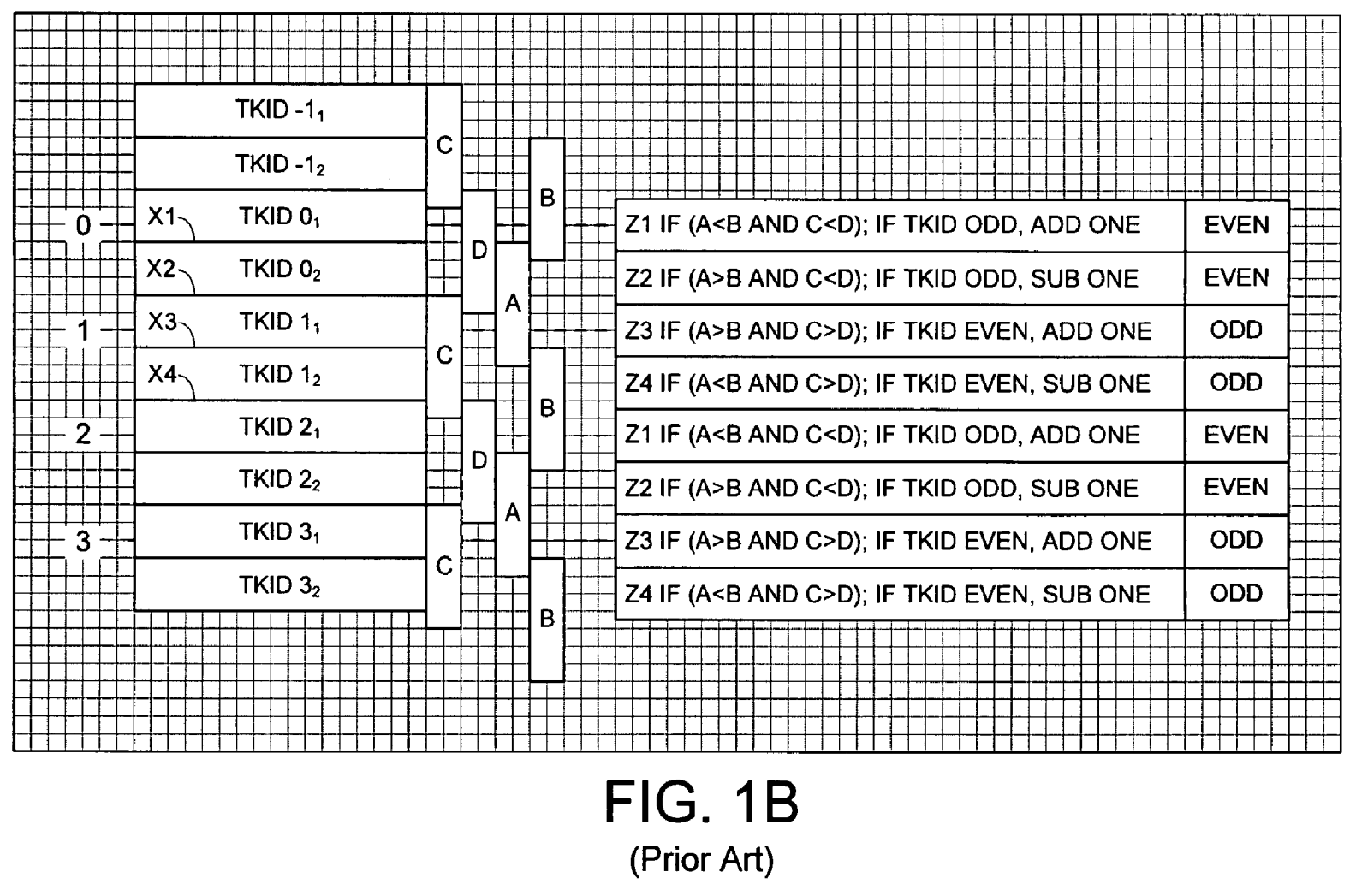

In the embodiment of FIG. 2, the data track centerlines do not correspond with the servo track centerlines similar to the prior art servo format shown in FIG. 1B. A track address is demodulated to identify the correct data track by evaluating the radial position of the head with respect to the servo bursts which define four radial servo position zones (Z1, Z2, Z3, Z4 in FIG. 2). If the head is determined to be in either Z1 or Z2, the track address should be an even number. If the detected track address is odd and the head is in Z1, then the detected track address is incremented, whereas if the detected track address is odd and the head is in Z2, then the detected track addresses is decremented. Similarly, if the head is determined to be in either Z3 or Z4, the track address should be an odd number. If the detected track address is even and the head is in Z3, then the detected track address is incremented, whereas if the detected track address is even and the head is in Z4, then the detected track address is decremented. This demodulation technique is similar to the demodulation technique used in the prior art servo format of FIG. 1B, further details of which are disclosed in U.S. Pat. No. 7,110,208 the disclosure of which is incorporated herein by reference.

Figure 3:
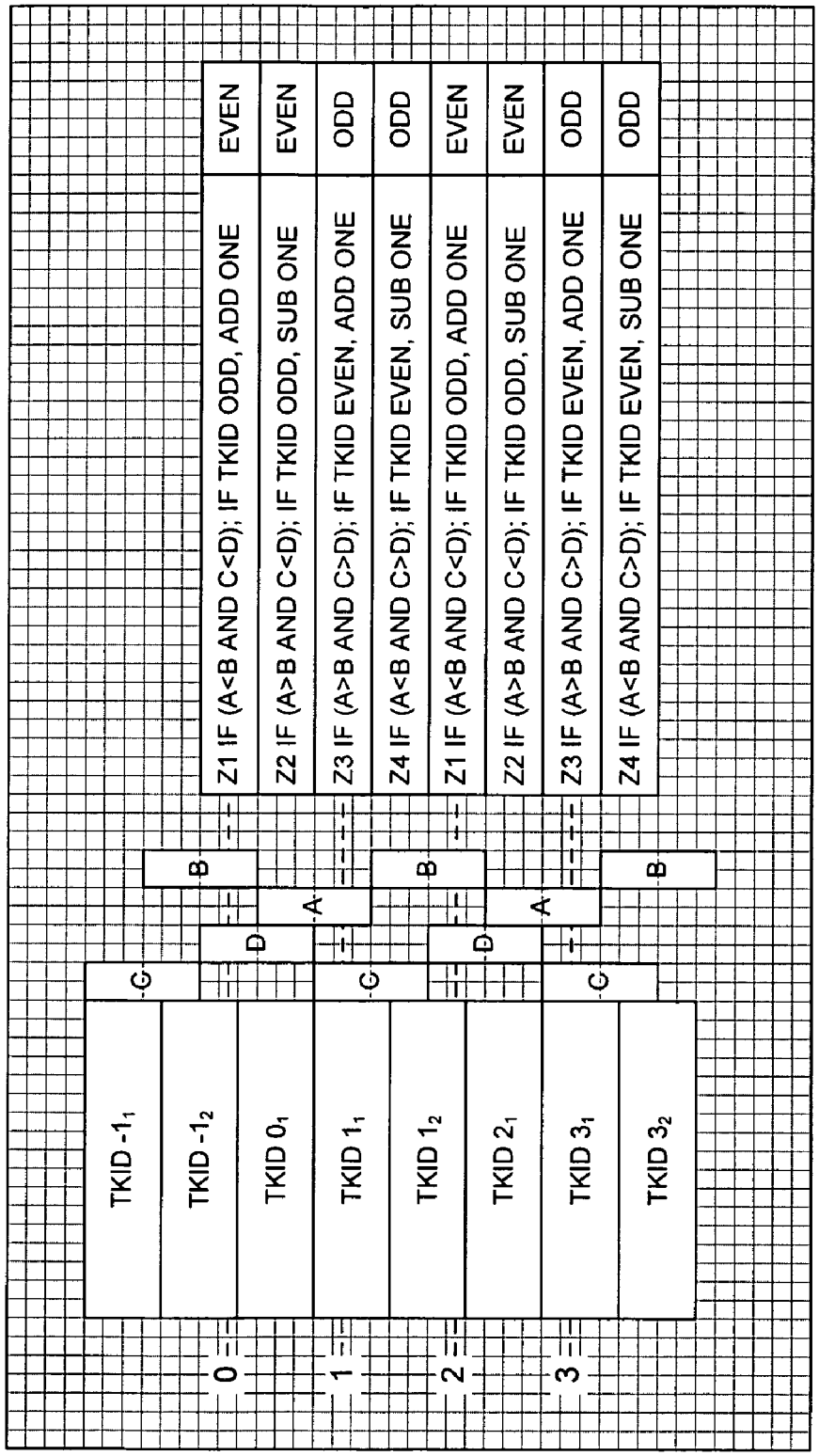
FIG. 3 shows a servo sector format according to an embodiment of the present invention wherein the servo bursts are stitched and trimmed.

Any suitable servo burst pattern may be employed in the embodiments of the present invention together with any conventional servo burst demodulation algorithm. In the embodiment shown in FIG. 2, the servo bursts are unstitched and untrimmed, whereas in an embodiment shown in FIG. 3, the servo bursts are stitched and trimmed. Yet another servo pattern shown in FIG. 4 is referred to as a null-phase or null-type servo pattern. In both the FIG. 3 and FIG. 4 embodiments, the demodulation of the track addresses is similar to the embodiment of FIG. 2 described above.

FIG. 5A shows a disk drive according to an embodiment of the present invention comprising a disk surface 16 including a plurality of servo sectors $18_0$-$18_N$ for defining a plurality of servo tracks 20. A head 22 is attached to a distal end of an actuator arm 24 which is rotated about a pivot by a voice coil motor 26. An external servo writer 28 executes the flow diagram of FIG. 5B in order to write the servo sectors $18_0$-$18_N$ to the disk surface 16. The external servo writer 28 inserts a push-pin 30 into the head disk assembly (HDA) of a disk drive for positioning the actuator arm 24 using highly sensitive positioning mechanics, such as a laser interferometer. The external servo writer 28 also inserts a clock head 32 into the HDA for writing and reading a clock track at the outer diameter of the disk surface 16. The write element of the head 22 is positioned over a first servo track (step 34) and a first track address is written over N revolutions (step 36). Referring to FIG. 2, for example, the write element is positioned so as to write the first half of TKID $1_1$ during a first revolution, the write element is moved radially four units, and then the second half of TKID $1_2$ is written over a second revolution. The write element is then positioned over a second servo track (step 38) and a second track address is written over M revolutions where M is less than N (step 40). Referring to FIG. 2, for example, the write element is positioned so as to write TKID $2_1$ during a single revolution.

In an alternative embodiment, a media writer is used to write the servo sectors $18_0$-$18_N$ to the disk surface 16. A plurality of disks is inserted into a media writer for writing the servo sectors, and then one or more of the disks are inserted into the HDA of a production disk drive. In yet another embodiment, an external servo writer or a media writer is used to write a plurality of seed tracks (e.g., spiral tracks) to the disk surfaces. The circuitry internal to each production disk drive is then used to read the seed tracks for self-servo writing the servo sectors to each disk surface.

Figures 6A, 6B:
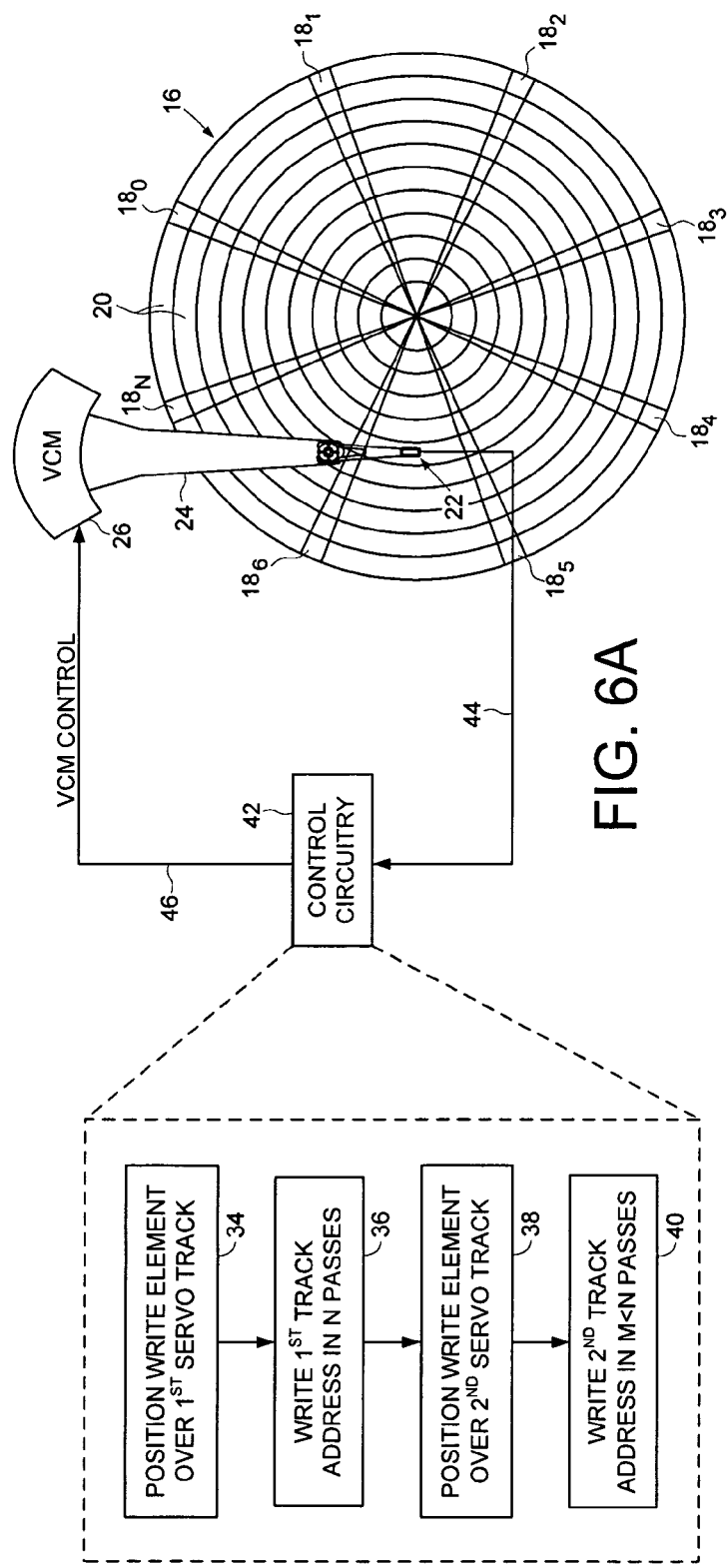
FIG. 6A shows an embodiment of the present invention wherein a disk drive self-servo writes the servo sectors to the disk.
FIG. 6B is a flow diagram according to an embodiment of the present invention executed by the disk drive to self-servo write the servo sectors to the disk.

FIG. 6A shows a disk drive according to an embodiment of the present invention comprising control circuitry 42 for self-servo writing the servo sectors $18_0$-$18_N$ to the disk surface 16. The control circuitry 42 processes the read signal 44 emanating from the head 22 to generate a control signal 46 applied to the VCM 26. For example, the control circuitry 42 may read a seed track previously written to the disk surface 16, or a previously written servo sector in a propagation technique of self-servo writing. The VCM 26 rotates the actuator arm 24 about the pivot in order to position the write element of the head 22 over the target servo tracks in order to write the servo sectors according to the flow diagram of FIG. 6B (which is similar to the flow diagram of FIG. 5B described above).

Any suitable control circuitry 42 may be employed in the embodiments of the present invention, such as any suitable integrated circuit or circuits. For example, the control circuitry 42 may be implemented within a read channel integrated circuit, or in a component separate from the read channel, such as a disk controller, or certain steps described above may be performed by a read channel and others by a disk controller.

In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 42 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 42 comprises suitable logic circuitry, such as state machine circuitry.

What is claimed is:

1. A disk drive comprising:
   a disk surface comprising a plurality of servo sectors for defining a plurality of servo tracks, wherein:
      a first servo sector for defining a first servo track comprises a first track address having a first width; and
      a second servo sector for defining a second servo track comprises a second track address having a second width substantially less than the first width;
   a head actuated radially over the disk surface; and
   control circuitry operable to demodulate the servo sectors by:
      reading one of the servo sectors and detecting an estimated track address;
      reading the servo bursts to determine a radial servo position zone; and
      adjusting the estimated track address in response to the radial servo position zone.

2. The disk drive as recited in claim 1, wherein the servo sectors further comprise servo bursts having a third width less than the first width.

3. The disk drive as recited in claim 1, wherein the second width is approximately half the first width.

4. The disk drive as recited in claim 1, wherein the control circuitry is further operable to adjust the estimated track address by incrementing the estimated track address.

5. The disk drive as recited in claim 1, wherein the control circuitry is further operable to adjust the estimated track address by decrementing the estimated track address.

6. A method of writing servo sectors onto a disk surface of a disk drive to define a plurality of servo tracks, the disk drive comprising a head actuated over the disk surface, the method comprising:
   writing a first servo sector for defining a first servo track by writing a first track address having a first width; and
   writing a second servo sector for defining a second servo track by writing a second track address having a second width substantially less than the first width,
   wherein the first track address is written over N revolutions of the disk and the second track address is written over M revolutions of the disk, wherein M is less than N.

7. The method as recited in claim 6, wherein writing the first servo sector further comprises writing servo bursts having a third width less than the first width.

8. The method as recited in claim 6, wherein the second width is approximately half the first width.

9. A disk drive comprising:
   a disk surface;
   a head actuated radially over the disk surface; and
   control circuitry operable to write servo sectors onto the disk surface to define a plurality of servo tracks by:
      writing a first servo sector for defining a first servo track by writing a first track address having a first width; and
      writing a second servo sector for defining a second servo track by writing a second track address having a second width approximately half the first width.

10. The disk drive as recited in claim 9, wherein the control circuitry is operable to write the first servo sector by writing servo bursts having a third width less than the first width.

11. The disk drive as recited in claim 9, wherein the control circuitry is further operable to write the first track address over N revolutions of the disk and write the second track address over M revolutions of the disk, wherein M is less than N.

12. The disk drive as recited in claim 9, wherein the disk drive further comprises a push pin connected to an actuator arm for controlling movement of the head.

13. The disk drive as recited in claim 9, wherein the servo sectors comprise null-phase servo bursts.

14. A disk drive comprising a disk surface comprising a plurality of servo sectors for defining a plurality of servo tracks, and a head actuated radially over the disk surface, wherein:
   a first servo sector for defining a first servo track comprises a first track address having a first width; and
   a second servo sector for defining a second servo track comprises a second track address having a second width approximately half the first width.

* * * * *